United States Patent [19]
Monroe et al.

[11] Patent Number: 5,603,554
[45] Date of Patent: Feb. 18, 1997

[54] REAR AXLE ASSEMBLY

[75] Inventors: David A. Monroe, Bloomfield Hills; John G. Thomas, Troy, both of Mich.

[73] Assignee: Chrysler Corporation, Auburn Hills, Mich.

[21] Appl. No.: 604,624

[22] Filed: Feb. 21, 1996

[51] Int. Cl.$^6$ .......................... B60B 27/02; B60B 35/16
[52] U.S. Cl. ........................................ 301/105.1; 301/137
[58] Field of Search .............................. 301/105.1, 124.1, 301/131, 137, 126, 112, 111; 29/894.361

[56] References Cited

U.S. PATENT DOCUMENTS

| | | | |
|---|---|---|---|
| 1,375,223 | 4/1921 | McIntyre | 301/112 X |
| 1,377,589 | 5/1921 | Keys | 301/137 |
| 2,069,253 | 2/1937 | Kliesrath | 301/124.1 X |
| 2,271,849 | 2/1942 | Wallace | 301/126 |

FOREIGN PATENT DOCUMENTS

| | | | |
|---|---|---|---|
| 3514770 | 11/1985 | Germany | 301/105.1 |
| 2066176 | 7/1981 | United Kingdom | 301/124.1 |

*Primary Examiner*—Russell D. Stormer
*Attorney, Agent, or Firm*—Edward A. Craig

[57] ABSTRACT

A rear axle assembly has a rotatable rear axle extending lengthwise within an elongated rear axle tube. A wheel hub is mounted on the axle for rotation as a unit therewith. A bearing supports the wheel hub for rotation. The inner race of the bearing is rigidly connected to the wheel hub. The outer race of the bearing is rigidly connected to the axle tube.

5 Claims, 2 Drawing Sheets

REAR AXLE ASSEMBLY

FIELD OF INVENTION

This invention relates to a rear axle assembly for an automotive vehicle.

BACKGROUND AND SUMMARY

In the conventional rear axle assembly, the wheel hub is secured to the axle by a nut on the end of the axle. Any axial forces on the wheel hub are transmitted directly to the axle. The weight of the vehicle on the wheel is transmitted by the wheel hub to the axle, causing a bending moment on the axle. The axle, which turns in a bearing in the axle tube, has to be strong and heavy to withstand this loading.

In accordance with the present invention, the wheel hub and bearing form a unit which is mounted directly on the axle tube, by-passing the axle. The axle does not need to be as big and strong as previously required. A lighter, less expensive axle may be employed. Moreover, it is not necessary to provide a nut to secure the wheel hub on the end of the axle.

The present invention provides a simplified rear axle assembly of modular design. Moreover, since the wheel hub and bearing unit are mounted directly on the axle tube, there is a reduction in end play of the axle, and greater control over lateral motion.

One object of this invention is to provide a rear axle assembly having the foregoing features and capabilities.

Another object is to provide a rear axle assembly which is composed of a relatively few simple parts, is of modular design, is rugged and durable in use, and is capable of being readily manufactured and assembled.

These and other objects, features and advantages of the invention will become more apparent as the following description proceeds, especially when considered with the accompanying drawings.

DETAILED DESCRIPTION

Figure 1:
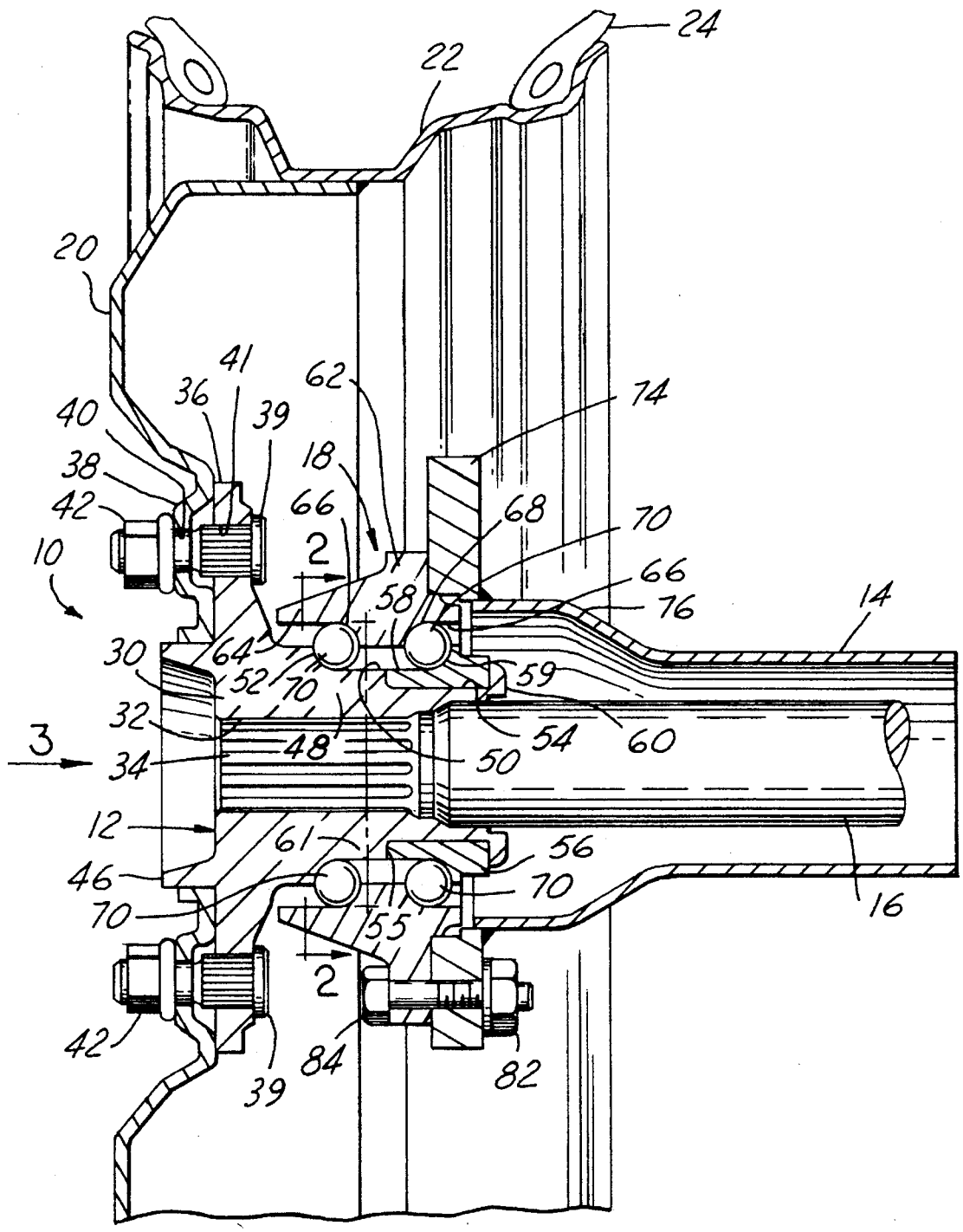
FIG. 1 is a fragmentary sectional view taken on the line 1—1 in FIG. 2, showing a rear axle assembly constructed in accordance with the invention.
Figure 2:
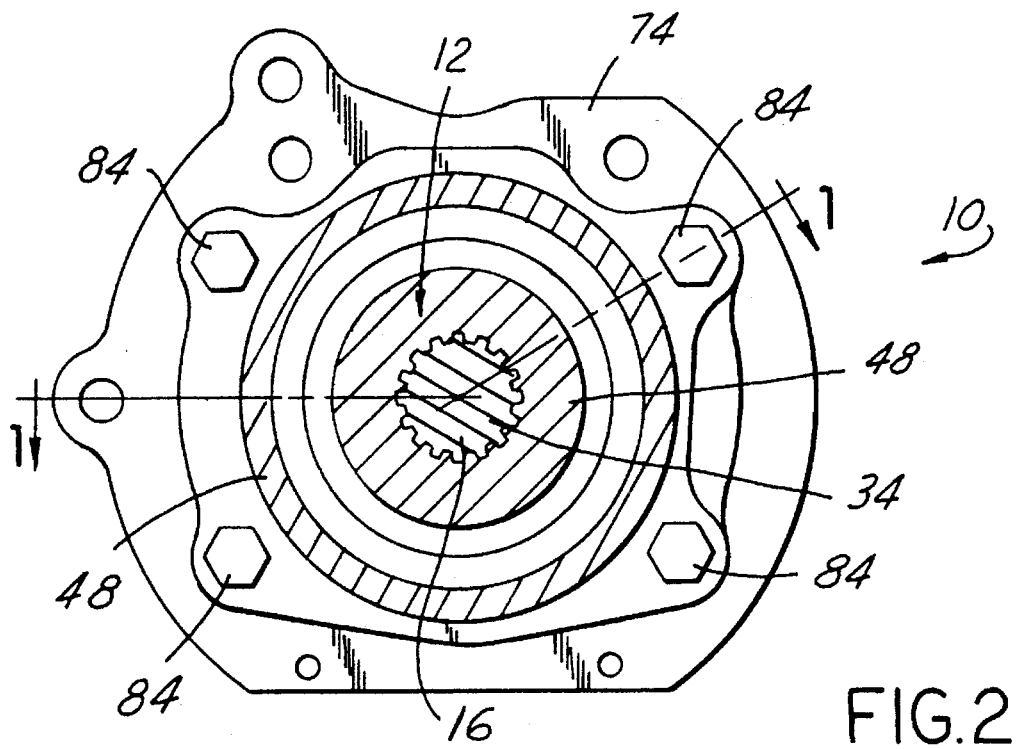
FIG. 2 is a sectional view taken on the line 2—2 in FIG. 1.
Figure 3:
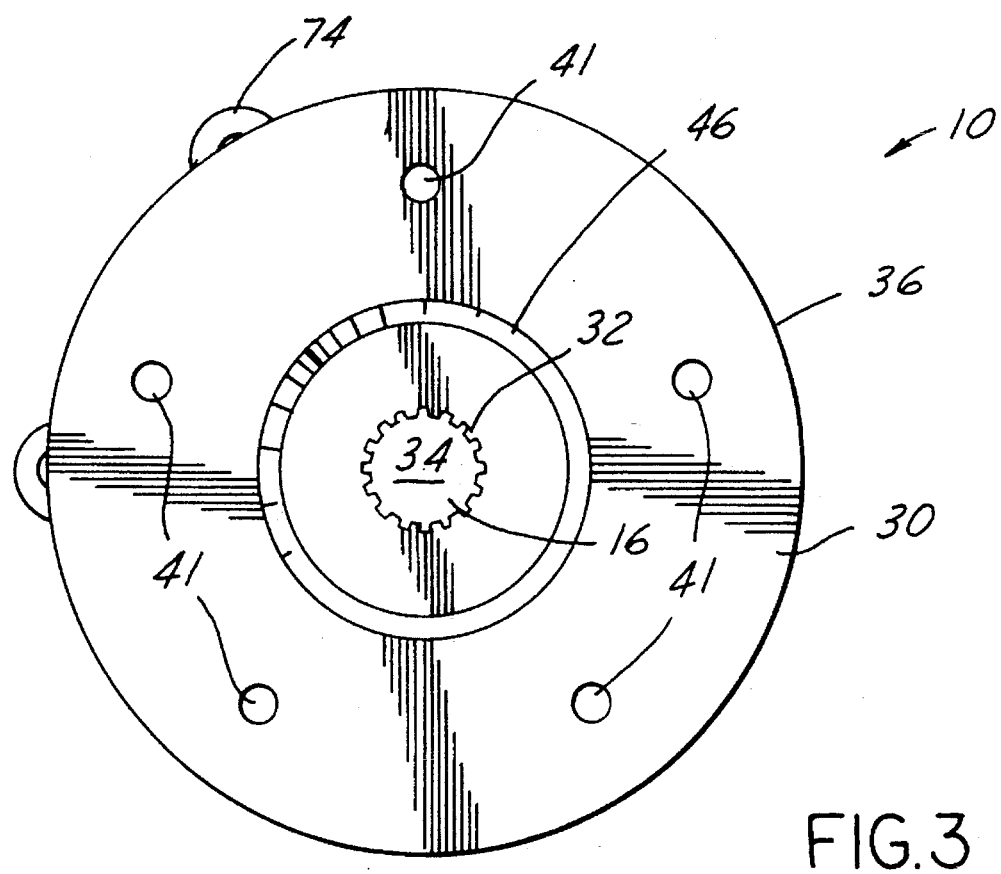
FIG. 3 is a view looking in the direction of the arrow 3 in FIG. 1, but with the wheel body removed.

Referring now more particularly to the drawings, the rear axle assembly 10 comprises a wheel hub 12, an elongated, transverse, horizontal axle tube 14, an elongated axle or axle shaft 16 extending lengthwise within the axle tube, and a bearing 18. An annular, generally circular wheel body 20 is secured to the wheel hub 12 and has a rim 22 on which a tire 24 is mounted.

The wheel hub 12 has a body 30 provided with a central opening 32 which receives the end 34 of the axle 16. The end 34 of the axle 16 is splined to the opening 32, as shown, so that rotation of the axle produces rotation of the wheel hub.

An integral annular flange 36 extends radially outwardly from the body 30 of the wheel hub 12. The radial inner wall portion 38 of the wheel body is secured to the flange 36 of the wheel hub by bolts 39 extending through holes 40 and 41 in the wall portion 38 and flange 36, and nuts 42 threaded on the bolts. An integral radially outwardly extending, annular projection 46 surrounds the opening 32 in the body 30 of the wheel hub and extends into a central opening in the wall portion 38 of the wheel body.

The wheel hub 12 has a tubular, integral axial extension 48. The axial extension 48 has a radially outer cylindrical surface 50 that terminates at the inner end thereof in an annular, concave, arcuately curved portion 52. The axial extension 48 has a second radially outer cylindrical surface 54 between the surface 50 and the outer end of the axial extension. The surface 54 is of reduced diameter relative to surface 50, forming an annular shoulder 55 between the two surfaces.

A ring 56 encircles and fits over the surface 54, abutting shoulder 55. The cylindrical radially outer surface 58 of the ring 56 is of the same diameter as the surface 50 and forms an axial continuation thereof. The cylindrical surface 58 terminates at the outer end thereof in an annular, concave, arcuately curved portion 59. The end of the axial extension 48 is turned radially outwardly to form an annular abutment 60 across the ring 56 to retain the ring 56 assembled on the axial extension. The axial extension 48 and the ring 56 cooperate in providing the inner race 61 of the bearing 18.

The outer race 62 is in the form of a circular member which encircles the axial extension 48 in concentric, radially spaced relation thereto. The outer race 62 has a radially inner cylindrical surface formed by two axially separated, concentric surface portions 64 and 66 which terminate at the adjacent ends thereof in axially spaced, annular, concave, arcuately curved portions 66 and 68 which confront the curved portions 52 and 59, respectively, of the inner race 61. The surfaces 50 and 58 of the inner race 61 and the surfaces 64 and 66 of the outer race 62 provide radially spaced ball tracks for the balls 70 of bearing 18.

The axle tube 14 is rigidly mounted on the vehicle by suitable means (not shown). A mounting flange 74 extends radially outwardly from the enlarged outer end 76 of the axle tube 14 and is rigidly secured thereto as by welding. The outer race 62 is rigidly secured to the mounting flange 74 by nuts 82 threaded on bolts 84.

The wheel hub 12 including the wheel hub body 30 and axial extension 48 are formed of one piece of metal and together with the ring 56, balls 70 and outer race 62 form a wheel hub and bearing unit which is capable of being pre-assembled and slipped on the end of the axle 16 and readily bolted to the flange 74 of the axle tube 14.

Because the wheel hub and bearing unit is mounted directly on the axle tube 14, the weight of the vehicle is taken off of the axle, so that the axle is required only to deliver torque to the rear wheels. The weight of the vehicle is transferred to the axle tube directly, by-passing the axle. Lateral forces on the axle are reduced if not eliminated. The nut heretofore required to secure the wheel hub to the end of the axle is also eliminated.

What is claimed is:

1. A rear axle assembly comprising an elongated rear axle tube, a rotatable rear axle extending lengthwise within said rear axle tube, a wheel hub sleeved on said rear axle for rotation as a unit therewith, a bearing supporting said wheel hub for rotation, said bearing having an inner race and an outer race with rotatable bearing members between said races, said inner race being rigidly connected to said wheel hub, and means rigidly securing said outer race to said rear axle tube.

2. A rear axle assembly as defined in claim 1, wherein said wheel hub has an integral axial extension, and said inner race is provided on said axial extension.

3. A rear axle assembly as defined in claim 2, wherein said axial extension of said wheel hub has an axially outer end, said axial extension is formed with a first radially outer surface adjacent to said wheel hub providing a first bearing member track for said inner race, said axial extension is formed with a second radially outer surface between said first radially outer surface and said axially outer end which is of reduced diameter relative to said first radially outer surface, a ring member is disposed on and encircles said second radially outer surface and provides a second bearing member track for said inner race, and said axially outer end is turned radially outwardly to form a retainer for said ring member.

4. A rear axle assembly as defined in claim 3, wherein said wheel hub and said axial extension are formed of one piece of metal.

5. A rear axle assembly as defined in claim 4, wherein said wheel hub, axial extension, inner and outer races, ring member and bearing members form a sub-assembly adapted to be secured as a unit to said axle tube by said securing means.

* * * * *